Sept. 27, 1938. M. J. REID 2,131,072
SILVER RECOVERY
Filed April 9, 1937
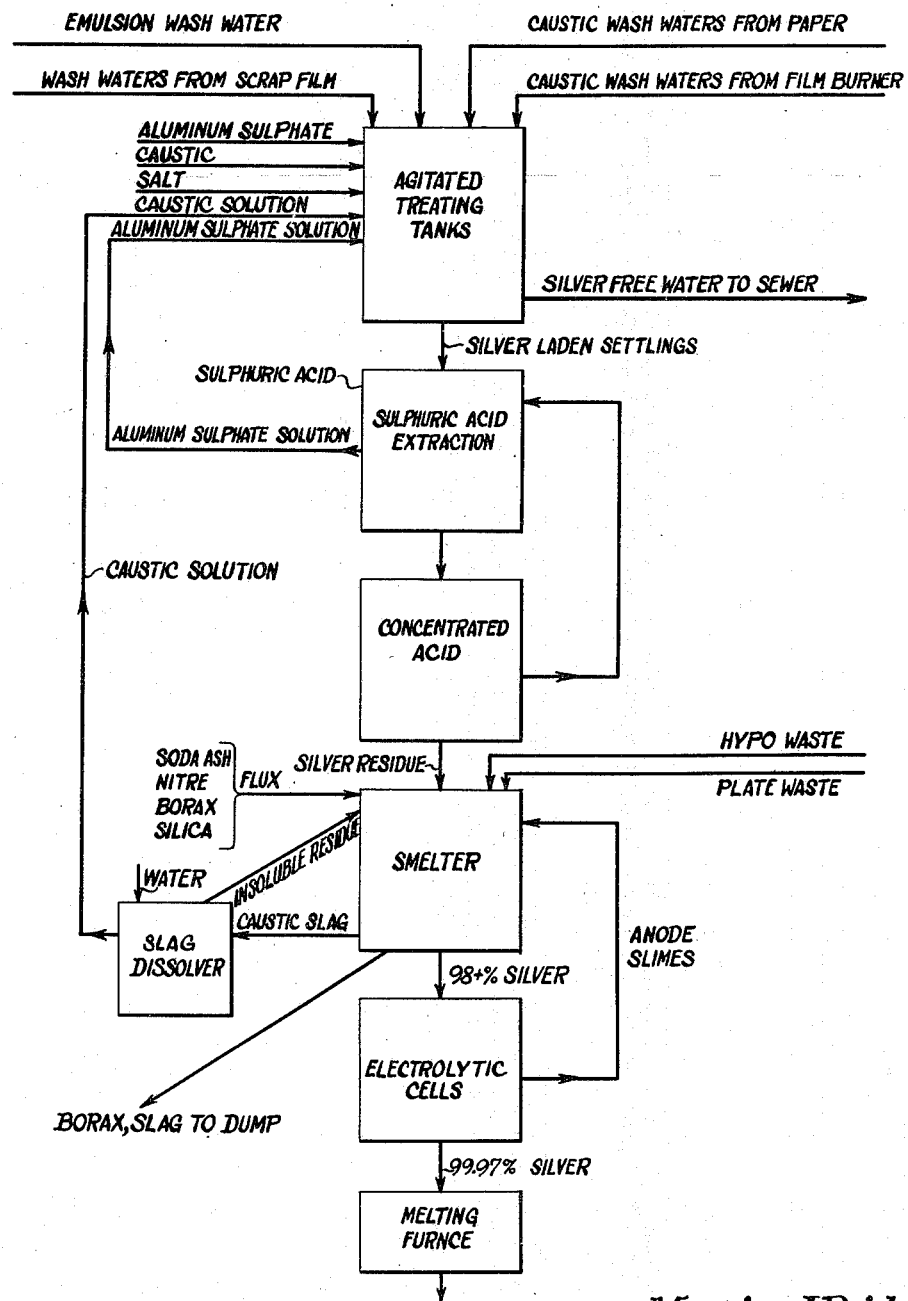
Marvin J. Reid,
INVENTOR:
BY Newton M. Perrins
ATTORNEYS.

Patented Sept. 27, 1938

2,131,072

UNITED STATES PATENT OFFICE 2,131,072

SILVER RECOVERY

Marvin J. Reid, Rochester, N. Y., assignor to Eastman Kodak Company, Rochester, N. Y., a corporation of New Jersey Application April 9, 1937, Serial No. 135,953

13 Claims. (Cl. 75—83)

This invention relates to processes for the production and recovery of metals from sources which contain only small or minute amounts of metals or metal-containing components, and more particularly to processes for the recovery of silver from solutions containing only small amounts of silver or silver containing components.

In copending application Serial No. 135,952 by Hickman, Turner and Weyerts there is described a process similar to mine. However, my process constitutes an improvement thereover. As pointed out in the aforementioned application, various materials, such as waste liquids, ores and the like, contain small amounts of precious metals such as silver. One example of such waste liquids is the various liquids obtained in the photographic industry. These liquids contain only a very small or minute amount of silver. Standard metallurgical processes are unsatisfactory when applied to the treatment of such liquids. It is apparent that the problem of removing such precious metals involves not only developing a procedure which will successfully operate on small quantities but in addition there is the problem of keeping the cost of operation such that the recovery of such metals will be profitable.

Inasmuch as the materials treated are in great volumes, features which at first consideration might appear unimportant, in fact may have considerable bearing on the process. I have found a process adapted to recovering silver from sources in which the silver or silver containing components are present in very small amounts, that economically and efficiently permits the recovery of a material portion of the silver.

This invention has as one object to provide a process for producing or recovering metals from various sources of materials containing only small or minute quantities of the metal. Another object is to provide a process for treating solutions containing small amounts of metals in which the metal recovery is substantially complete. A still further object is to provide a process of recovering metals present only in small amounts which is simple and economic in operation. A still further object is to provide a process for the recovery of small amounts of metals in which there are no material losses of the agent employed. Still another object is to provide a method for improving liquids containing small amounts of silver or silver components whereby the metal may be more readily recovered. Still another object is to provide a process particularly adapted for recovering silver present in liquids obtained from photographic processes. Another object is to provide a process for the recovery of silver contained in wash solutions produced in photographic processes. A still further object is to provide a process for the recovery of valuable components contained in scrap film and other waste obtained in the production of photographic materials. Another object is to provide a recovery process in which the agents employed may be produced or regenerated. Still another object is to provide a silver recovery process which is simple and economic. A still further object is to provide a process for the recovery of silver from waste photographic materials in which the silver produced is of a high-grade quality. A still further object is to provide a process for refining recovered silver. Other objects will appear hereinafter.

These objects are accomplished by my invention which includes the steps of adjusting the composition of the metal-containing liquid, segregating the desired metal in a sludge, reducing the sludge volume, recovering of the desired metal, and refining thereof.

For a more complete understanding of my invention, reference is made to the attached drawing, forming a part of the present application. This drawing is in the nature of a flow sheet graphically illustrating the series of steps employed in carrying out one embodiment of my invention. Reference to the attached drawing may be had in a consideration of the following example which is set forth to illustrate the preferred embodiment of my process. It is to be understood that the values to be set forth in this example are primarily for the purposes of illustrating my preferred embodiment and are not to be construed as limiting by invention.

Liquids from which silver is to be recovered may be, for convenience, collected in a large pit or container. These liquids containing only a small amount of precious metal may be obtained from waste water produced in photographic processing, washed film scrap and various other sources. The liquids in the example under consideration contained about 11 troy ounces of silver per thousand gallons of liquid. In addition, there were various other components such as gelatin, bromides, iodides and the like.

I have found that such liquids may be improved in various ways which facilitate silver recovery therefrom. The solution may be brought to a proper pH by alkali addition. By this procedure better coagulation and sludge formation is obtained. In my process I am able to carry out this alkali addition by using the liquid obtained from dissolving slag as will be pointed out in detail hereinafter. Such procedure not only permits bringing the liquids to the best pH value, but by my process there is a material cut in process cost as will be apparent as the description proceeds. In addition to my alkali treatment, I have found that the liquid may be further improved by adding common salt, sodium chloride, thereto. This addition converts any dissolved silver derivatives to a form in which they may be more easily removed. Salt is also used to decrease the solubility of silver chloride and other silver salts. This decrease in solubility is due to the common ion effect. I have found that the sodium salts have considerable advantage over other types of chlorides and that their use eliminates difficulties in the smelting operation as well as prevents certain impurity deposits in the recovered silver. In addition, it is apparent that the use of common salt has the advantage of being particularly economical because it is inexpensive and easily obtainable.

After the waste solutions have been improved as described, an agent, for example aluminum sulphate ($Al_2(SO_4)_3$) is added thereto in order to produce an aluminum hydroxide floc which carries down a sludge containing the silver component. This may be allowed to settle for a period of a few hours and the clear super-natant liquid above the silver containing sludge may be discharged to the sewer. The silver sludge is generally comprised of metal or metal derivatives, agent, gelatin and other materials initially contained in the waste solution.

Hence, the silver material while in a more concentrated state, still is not in a condition for easy or efficient removal. However, if the newly deposited silver containing sludge is treated with sulphuric acid (or other agent), not only is the sludge volume materially reduced but solutions which may be used in the aforementioned sludge depositing step may be generated. A satisfactory acid addition is about 5 cc. of 96% sulphuric acid per gallon of sludge. However, varying amounts of the sulphuric or equivalent acid, if a different acid or concentration is utilized, will be employed, depending on the sludge volume and other such factors or if a dilute sulphuric acid is used. Preferably, the limits of acid treatment should be additions amountings to from $\frac{1}{10}$th of 1 percent up to 10% by volume of sludge of 95% sulphuric acid or its equivalent.

The acid treatment may be carried out in one or more steps. I have found two steps to be desirable, such as for example, in accordance with the attached flow sheet. That is, the newly deposited sludge may be treated with dilute sulphuric acid and flocculating agent regenerated. That is, if the sludge is treated with an acid having a radical the same as that of the flocculating agent added, then regeneration of agent takes place. For example, if aluminum or copper sulphates were the agents, then treatment of the sludge with sulphuric acid as above described produces a liquid which may be used for agent. On the other hand, if a chloride had been employed as agent, then hydrochloric acid might be added for agent regeneration. Whatever acid is selected should be used throughout the treatment. For example, if hydrochloric acid is substituted in the dilute acid treatment it should also be used for the concentrated treatment.

The sludge remaining from this dilute acid treatment may then be treated with concentrated acid, accompanied with heating, if desired. This concentrated acid treatment is somewhat more drastic and produces still further reduction in volume, thereby forming a dilute sulphuric acid which may be employed in the preceding dilute acid treatment. As indicated, other acids, such as hydrochloric, nitric or various mixtures may be employed in a similar order of steps, but the sulphuric acid is preferred. The newly deposited sludge may be easily treated. By newly deposited, I refer to a sludge, which is from a few hours to a few days old, as contrasted to sludge that has been permitted to remain untreated for 2–3 days or more.

Inasmuch as the liquids resulting from my sulphuric or other acid treatment are returned to the preceding steps, any metal dissolved in the acid is not lost.

The fraction resulting from my acid treatment will comprise a sludge which has had its volume substantially reduced and may contain on a dry basis a percentage of silver between 20%–50%. It is apparent by my novel treatment that now a material has been obtained from which metal may be recovered as such. This material may be dried and separated from slurry by centrifuging, settling or other similar treatment and the cake thus obtained, dried, pulverized and otherwise prepared for reduction to silver by fusion.

I have found that by my novel procedure in the fusion of silver-containing materials, that bar silver may be obtained in a high state of purity. Also by the proper choice of solid materials in this step materials which may be used for furnishing an alkali addition will be produced.

The pulverized silver cake is fed into any conventional fusion apparatus such as crucibles, electric or gas fire furnaces or other similar equipment employed in metallurgical processes. To these silver materials there is added a small amount of silica in order to assist in reducing corrosion of the refractory furnace linings. A small amount of sodium nitrate is added to oxidize sulphides which may be present. A substantial amount of soda ash is added. Borax may also be added to the flux in order to reduce the viscosity of slags, especially when certain foreign substances are present, such as aluminum and calcium salts. The fusion step is then carried out in a manner similar to procedure known in metallurgy and a very high-grade silver metal is obtained therefrom.

This molten silver may be cast into anodes and further refined electrolytically or the silver may be otherwise employed or processed. The slag resulting from this fusion step is treated with water. I have found that water dissolves the slag away from any silver entrapped therein. I have found that the liquid resulting from this water treatment is sufficiently alkali to be used in the aforementioned alkali addition thereby reducing the cost of operation. Inasmuch as the preceding step involves the treatment of liquids in the magnitude of 20,000–30,000 gallons, it is apparent that from the quantities involved, the ability to employ steps which produce materials that can be used at other places in the process is of great importance.

The silver caught in the slag and which is separated by the water treatment in the form of the insoluble residue may be returned to the furnace. Borax may be added thereto and the materials fused, producing pure metallic beads of silver from which the borax slag may be separated. I have also found that hypo wastes, various forms of silver thiosulfates, plate wastes, silver anode slags and the like may be fed into the furnace with or without silver sludge and treated with the slag aforementioned, or with borax or a combination of these materials, and silver obtained therefrom.

From a consideration of the preceding example, it may be seen that I have provided a simple, efficient and economic process for the recovery of precious metals, such as silver, from sources which contain the metal in small quantities. By means of my improvement treatment I am able to facilitate silver recovery in the form of sludge and to recover a utilizable quantity of metal therefrom. Also I am able to regenerate or produce a large part of the agent used in my process thereby rendering the cost of my process very low. In addition, I have provided for the use of chemical materials which are relatively cheap and readily available on the market.

From the preceding it is apparent that my process is susceptible to some modification. For example, the deposition of sludge may be carried out on several supplies of liquid before the sludge is transferred to treatment for reducing sludge volume. Centrifuging, drying or pulverizing may be more or less omitted or steps accomplishing a similar result substituted. Therefore, I do not wish to be restricted in my invention excepting insofar as is necessitated by the prior art and the appended claims.

What I claim and desire to secure by Letters Patent of the United States is:

1. A process for the production of silver from liquids containing silver in relatively small quantities, which comprises adding alkali and salt to the liquid, then treating the liquid with an agent whereby a sludge containing silver is obtained, subjecting the sludge to treatment which reduces the sludge volume and regenerates the precipitating agent, and employing the re-formed precipitating agent for the treatment of further metal-containing materials.

2. A process for the recovery of silver from liquids containing only small quantities thereof, which comprises adding alkali and salt to the liquid, then treating the liquid with a precipitating agent which carries sliver down as a sludge, subjecting the sludge to the action of acid, which reduces the sludge volume and regenerates the precipitating agent, separating the sludge fraction remaining, and applying a fusion step for obtaining silver therefrom.

3. The process of recovering silver from materials containing silver in small quantities, which comprises obtaining solutions containing small quantities of silver, treating the solution with liquid resulting from lixiviating alkali slag, treating the silver solution with an agent which causes the deposition of a sludge containing silver, subjecting the sludge to treatment with sulphuric acid for concentration of the silver content thereof.

4. A process for the recovery of silver from solutions containing only small amounts thereof, which comprises adjusting the pH of the solutions by the addition of a liquid obtained from the lixiviation of alkali, adding an aluminum sulfate agent to the solution whereby silver-containing sludge is produced, treating the silver sludge with sulphuric acid for re-forming further precipitating agent and the reduction of sludge volume, and recovering precious metal from the sludge fraction remaining.

5. A process for the recovery of silver from waste photographic liquids, which comprises treating the liquid with alkali and salt, subjecting the liquid to treatment with a sulphate sludge-forming agent which produces a sludge containing silver, subjecting the sludge to treatment with sulphuric acid, whereby agent is re-formed and the sludge volume reduced, and recovering silver from the sludge fraction remaining from the sulphuric acid treatment.

6. A process for the recovery of silver from film materials containing only a small amount thereof, which comprises obtaining a liquid containing only a small amount of silver by washing said film materials, subjecting the liquid to a sludge-forming treatment with an agent whereby a sludge containing silver is obtained, and subjecting the newly precipitated sludge to treatment with acid whereby the sludge volume is reduced and an agent re-formed for use in the sludge-forming treatment.

7. A process for the recovery of silver from wash liquids obtained in photographic processes, which comprises adjusting the pH value of said liquids by the addition of solution resulting from the lixiviation of an alkali slag, precipitating silver from the solutions by means of an aluminum floc precipitant whereby a silver-containing sludge is produced, subjecting the newly precipitated sludge to an acid treatment whereby precipitating agent is regenerated and sludge volume reduced, and subjecting the sludge fraction remaining from the acid treatment to fusion in the presence of an alkali flux.

8. A process for the recovery of silver from wash solutions obtained in photographic processes, which comprises improving said solutions by the addition of an alkali and sodium chloride thereto, precipitating silver from the solutions by means of an aluminum floc precipitant whereby a silver-containing sludge is produced, subjecting the newly formed sludge to an acid treatment whereby precipitating agent is regenerated and sludge volume reduced, subjecting the sludge fraction remaining, to fusion in the presence of a soda ash, silica, and nitre flux, and employing the slag as a source for the aforementioned alkali addition.

9. A process for the recovery of silver from solutions containing only small amounts of the metals, which comprises adjusting the pH of said solutions to between about 6–8, adding sulphate precipitating agent to the solution, whereby silver-containing sludge is produced, treating the metal sludge with dilute sulphuric acid and then with a more concentrated acid, for re-forming further precipitating agent and the reduction of sludge volume, and recovering silver from the sludge fraction remaining.

10. A process for the recovery of silver from wash solutions obtained in photographic processes, which comprises improving said solutions by adding thereto salt and alkaline liquid resulting from extracting slag with water, depositing silver from the improved solution by means of an aluminum floc whereby a silver-containing sludge is produced, subjecting the sludge to a dilute acid treatment then a concentrated acid treatment whereby sludge volume is reduced, subjecting the sludge fraction remaining therefrom to fusion in the presence of a soda ash flux for the recovery of silver therefrom, extracting the slag with water whereby the aforementioned alkaline liquid is obtained and an insoluble silver-containing residue produced, and subjecting the insoluble residue to fusion in the presence of borax for recovering silver.

11. A process for the recovery of silver which comprises subjecting silver-containing solutions to treatment with an agent which causes the deposition of a silver-containing sludge, subjecting the sludge to treatment for reducing the volume thereof, treating the sludge remaining to separate acid slurry, caking and drying the sludge, fusion-reducing the sludge to produce anode silver, electrolyzing the anode silver, and subjecting anode slimes from the aforementioned electrolysis to fusion in the presence of a flux whereby silver is recovered therefrom.

12. A process for the production of silver from liquids containing silver in relatively small quantities, which comprises treating the liquid with an agent, whereby a sludge containing silver is obtained, subjecting the sludge to treatment which reduces the sludge volume and re-forms further agent, employing at least a part of the re-formed agent for the treatment of further silver containing materials, and recovering silver from said sludge of reduced volume.

13. A process for the recovery of silver from liquids containing only small quantities thereof, which comprises treating the liquid with an agent which carries silver down as a sludge, subjecting the sludge to the action of acid which reduces the sludge volume and re-forms further agent, and employing at least a part of the re-formed agent for the treatment of further silver containing liquids.

MARVIN J. REID.